(12) United States Patent
Dai (10) Patent No.: US 10,843,964 B2
(45) Date of Patent: Nov. 24, 2020

(54) INTERFACIAL BONDING OXIDES FOR GLASS-CERAMIC-TO-METAL SEALS

(71) Applicant: National Technology & Engineering Solutions of Sandia, LLC, Albuquerque, NM (US)

(72) Inventor: Steve Xunhu Dai, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/691,948

(22) Filed: Nov. 22, 2019

(65) Prior Publication Data

US 2020/0109085 A1    Apr. 9, 2020

Related U.S. Application Data (62) Division of application No. 15/340,797, filed on Nov. 1, 2016, now Pat. No. 10,562,815.

(60) Provisional application No. 62/249,843, filed on Nov. 2, 2015.

(51) Int. Cl.
*C03C 27/04* (2006.01)
*C03C 10/00* (2006.01)
*C01G 37/02* (2006.01)

(52) U.S. Cl.
CPC ............ *C03C 27/042* (2013.01); *C01G 37/02* (2013.01); *C03C 10/0027* (2013.01); *C03C 10/0054* (2013.01)

(58) Field of Classification Search
None
See application file for complete search history.

(56) References Cited

U.S. PATENT DOCUMENTS

| | | | |
|---|---|---|---|
| 4,135,936 A | 1/1979 | Ballard, Jr. | |
| 4,414,282 A | 11/1983 | McCollister et al. | |
| 5,820,989 A | 10/1998 | Reed et al. | |
| 8,082,663 B1 | 12/2011 | Monroe et al. | |
| 8,593,237 B1 | 11/2013 | Dai | |
| 9,878,944 B1 | 1/2018 | Dai et al. | |
| 10,059,625 B2 * | 8/2018 | Dai | C03C 27/02 |

OTHER PUBLICATIONS

Bauleke MP et al., "How to solve the problems of body cracking and glaze popping in stoneware bodies," *Kansas Geological Survey* Apr. 1978; bulletin 211(part 4):23-7.
Bengisu M et al., "Interfacial reactions between lithium silicate glass-ceramics and Ni-based superalloys and the effect of heat treatment at elevated temperatures," *J. Mater. Sci.* 2004;39:605-18.

(Continued)

*Primary Examiner* — Lisa L Herring
(74) *Attorney, Agent, or Firm* — Helen S. Baca; Kevin W. Bieg (57) ABSTRACT

The present invention relates to structure including an interfacial seal between a glass-ceramic component and a metal component, as well as methods for forming such structures. In particular embodiments, the interfacial seal includes a metal oxide. Such interfacial seals can be beneficial for, e.g., hermetic seals between a glass-ceramic component and a metal component.

9 Claims, 6 Drawing Sheets

(56) References Cited

OTHER PUBLICATIONS

Donald IW et al., "Interfacial reactions in glass-ceramic-to-metal seals," *J. Am. Ceram. Soc.* 2008;91(3):715-20.
Donald IW, "Preparation, properties and chemistry of glass- and glass-ceramic-to-metal seals and coatings," *J. Mater. Sci.* 1993;28:2841-86.
Fluegel A, "Thermal expansion calculation for silicate glasses at 210° C. based on a systematic analysis of global databases," *Glass Technology—Eur. J. Glass Sci. Technol. A* 2010;51(5):1191-201.
Hammetter WF et al., "Crystallization kinetics of a complex lithium silicate glass-ceramic," *J. Am. Ceram. Soc.* 1987;70(8):577-82.
Headley TJ et al., "Crystallization of a glass-ceramic by epitaxial growth," *J. Am. Ceram. Soc.* 1984;67(9):620-5.
Knorovsky GA et al., "Interfacial debonding in stainless steel/glass ceramic seals," *Sandia Report No. SAND89-1866C*, Albuquerque: Sandia National Laboratories, Apr. 1991 (10 pp.).
Kunz SC et al., "Thermal expansion mismatch produced by interfacial reactions in glass-ceramic to metal seals," *Adv. Ceram. Mater.* 1987;2(1):69-73.
Loehman RE et al., "Design of high thermal expansion glass-ceramics through microstructural control," in *Ceramic Microstructures '86 (Materials Sciences Research vol. 21)*, eds. J.A. Pask and A.G. Evans, New York and London: Plenum Press, 1987, pp. 33-43.
Loehman RE, "Interfacial reaction in ceramic-metal systems," *Ceram. Bull.* 1989;68(4):891-6.
Loehman RE, "Processing and interfacial analysis of glass-ceramic to metal seals," in *Technology of glass, ceramic, or glass-ceramic to metal sealing* (eds. WE Moddeman, CW Merten, and DP Kramer), American Society of Mechanical Engineers:1987, vol. 4, pp. 39-46.
Susan DF et al., "Surface alloy depletion and martensite formation during glass to metal joining of austenitic stainless steels," *Sci. Technol. Welding Joining* 2012;17(4):321-32.
Susan DF et al., "The effects of pre-oxidation and alloy chemistry of austenitic stainless steels on glass/metal sealing," *Oxid. Metals* 2010;73(10):311-35.
Watkins RD et al., "Interfacial reaction between a complex lithium silicate glass-ceramic to Inconel 718," *Adv. Ceram. Mater.* 1986;1(1):77-80.

* cited by examiner

INTERFACIAL BONDING OXIDES FOR GLASS-CERAMIC-TO-METAL SEALS

CROSS-REFERENCE TO RELATED APPLICATION

This application is a divisional of prior application Ser. No. 15/340,797, filed Nov. 1, 2016, which claims the benefit of U.S. Provisional Application No. 62/249,843, filed Nov. 2, 2015; and each application is hereby incorporated by reference in its entirety.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to structure including an interfacial seal between a glass-ceramic component and a metal component, as well as methods for forming such structures. In particular embodiments, the interfacial seal includes a metal oxide. Additional details follow.

BACKGROUND OF THE INVENTION

Glass-ceramic-to-metal seals involve complex interfacial reactions. In one instance, the structure includes a glass-ceramic (GC) component and a metal component (e.g., a stainless steel (SS) component), in which an interfacial seal is disposed between the GC component and the metal component. In particular, a glass-ceramic-to-stainless steel (GCtSS) seal is beneficial because coefficients of thermal expansion (CTEs) can be matched between the GC material and the SS material. However, bonding between the GC and the SS can be difficult to achieve, and retaining hermeticity of the seal remains an issue. Accordingly, there is a need for additional materials and methods to improve GC interfacial seals.

SUMMARY OF THE INVENTION

The present invention relates to structures including an interfacial seal between a metal component and a glass-ceramic (GC) component. Such interfacial seals can be formed by including one or more metal oxidants within the GC component, thereby facilitating redox reactions between the metal oxidants in the GC component with active reactants present in the metal component. Such redox reactions can form a thin layer of one or more metallic oxides, which can form, e.g., a hermetic seal.

In one aspect, the invention features a structure including: a metal component; a glass-ceramic component, where the glass-ceramic component includes one or more metal oxidants (e.g., any described herein); and an interfacial seal disposed between the glass-ceramic component and the metal component. In some embodiments, the seal includes a metal oxide.

In some embodiments, the glass-ceramic component includes of from about 0.5 wt. % to about 5 wt. % of the one or more metal oxidants (e.g., 0.5 wt. % to 4 wt. %, 0.5 wt. % to 3 wt. %, 0.5 wt. % to 2 wt. %, 0.5 wt. % to 1 wt. %, 1 wt. % to 5 wt. %, 1 wt. % to 4 wt. %, 1 wt. % to 3 wt. %, 1 wt. % to 2 wt. %, 1.5 wt. % to 5 wt. %, 1.5 wt. % to 4 wt. %, 1.5 wt. % to 3 wt. %, 1.5 wt. % to 2 wt. %, 2 wt. % to 5 wt. %, 2 wt. % to 4 wt. %, or 2 wt. % to 3 wt. %). In other embodiments, the glass-ceramic component includes of from about 0.1 mol. % to about 5 mol. % of the one or more metal oxidants (e.g., from about 0.2 mol. % to about 5 mol. %, such as from 0.25 mol. % to 5 mol. %, from 0.25 mol. % to 4 mol. %, from 0.25 mol. % to 3 mol. %, from 0.25 mol. % to 2 mol. %, from 0.25 mol. % to 1 mol. %, from 0.25 mol. % to 0.5 mol. %, 0.5 mol. % to 5 mol. %, from 0.5 mol. % to 4 mol. %, from 0.5 mol. % to 3 mol. %, from 0.5 mol. % to 2 mol. %, from 0.5 mol. % to 1 mol. %, 1 mol. % to 5 mol. %, from 1 mol. % to 4 mol. %, from 1 mol. % to 3 mol. %, from 1 mol. % to 2 mol. %, 2 mol. % to 5 mol. %, from 2 mol. % to 4 mol. %, and from 2 mol. % to 3 mol. %). Exemplary metal oxidants include cobalt oxide, nickel oxide, lead oxide, copper oxide, silver oxide, iron oxide, molybdenum oxide, tungsten oxide, and tin oxide, as well as combinations thereof.

In another aspect, the present invention features a method including providing a glass-ceramic component configured to provide a glass-ceramic composition having one or more metal oxidants; providing a metal component, where the glass-ceramic component is contacted with a portion of the metal component; heating the glass-ceramic component and metal component to a first temperature $T_1$ of from about 900° C. to about 1050° C.; initially cooling to a second temperature $T_2$ of from about 400° C. to about 750° C. (e.g., rapidly cooling at a rate $r_2$ greater than about 30° C./minute to a second temperature $T_2$ (e.g., of from about 400° C. to about 800° C.)); and further cooling the mixture to a fourth temperature $T_4$ of from about 10° C. to about 500° C. In some embodiments, the method thereby forms an interfacial seal between the glass-ceramic component and the metal component. In other embodiments, the method further includes reheating the mixture to a third temperature $T_3$ of from about 750° C. to about 850° C. (e.g., thereby facilitating formation of a quartz $SiO_2$ phase within the glass-ceramic composition).

Temperatures $T_1$, $T_2$, $T_3$, and $T_4$ can be any useful temperature or temperature range. In some embodiments, temperature $T_1$ is of from about 900° C. to about 1500° C. (e.g., of from 900° C. to 1250° C., from 900° C. to 1200° C., from 900° C. to 1100° C., from 900° C. to 1050° C., from 900° C. to 1000° C., from 925° C. to 1500° C., from 925° C. to 1250° C., from 925° C. to 1200° C., from 925° C. to 1100° C., from 925° C. to 1050° C., from 925° C. to 1000° C., from 950° C. to 1500° C., from 950° C. to 1250° C., from 950° C. to 1200° C., from 950° C. to 1100° C., from 950° C. to 1050° C., from 950° C. to 1000° C., from 1000° C. to 1500° C., from 1000° C. to 1250° C., from 1000° C. to 1200° C., from 1000° C. to 1100° C., from 1000° C. to 1050° C., or from 1000° C. to 1000° C.).

In other embodiments, temperature $T_2$ is of from about 300° C. to about 900° C. (e.g., of from 300° C. to 850° C., from 300° C. to 800° C., from 300° C. to 750° C., from 300° C. to 700° C., 300° C. to 650° C., 300° C. to 600° C., from 350° C. to 900° C., from 350° C. to 850° C., from 350° C. to 800° C., from 350° C. to 750° C., from 350° C. to 700° C., 350° C. to 650° C., 350° C. to 600° C., from 375° C. to 900° C., 375° C. to 850° C., from 375° C. to 800° C., from 375° C. to 750° C., from 375° C. to 700° C., 375° C. to 650° C., 375° C. to 600° C., from 400° C. to 900° C., 400° C. to 850° C., from 400° C. to 800° C., from 400° C. to 750° C., from 400° C. to 700° C., 400° C. to 650° C., 400° C. to 600° C., from 450° C. to 900° C., 450° C. to 850° C., from 450° C. to 800° C., from 450° C. to 750° C., from 450° C. to 700° C., 450° C. to 650° C., 450° C. to 600° C., from 475° C. to 900° C., 475° C. to 850° C., from 475° C. to 800° C., from 475° C. to 750° C., from 475° C. to 700° C., 475° C. to 650° C., 475° C. to 600° C., from 500° C. to 900° C., 500° C. to 850° C., from 500° C. to 800° C., from 500° C. to 750° C., from 500° C. to 700° C., 500° C. to 650° C., or 500° C. to 600° C.).

In yet other embodiments, temperature $T_3$ is of from about 650° C. to about 950° C. (e.g., of from 650° C. to 900° C., from 650° C. to 850° C., from 650° C. to 800° C., from 650° C. to 750° C., from 650° C. to 700° C., from 700° C. to 950° C., from 700° C. to 900° C., from 700° C. to 850° C., from 700° C. to 800° C., from 700° C. to 750° C., from 750° C. to 950° C., from 750° C. to 900° C., from 750° C. to 850° C., from 750° C. to 800° C., from 775° C. to 950° C., from 775° C. to 900° C., from 775° C. to 850° C., from 775° C. to 800° C., from 800° C. to 950° C., from 800° C. to 900° C., from 800° C. to 850° C., from 825° C. to 950° C., from 825° C. to 900° C., from 825° C. to 850° C., from 850° C. to 950° C., from 850° C. to 900° C., from 875° C. to 950° C., or from 875° C. to 900° C.).

In some embodiments, temperature $T_4$ is of from about 5° C. to about 500° C. (e.g., of from 5° C. to 450° C., from 5° C. to 400° C., from 5° C. to 350° C., from 5° C. to 300° C., from 5° C. to 250° C., from 5° C. to 200° C., from 5° C. to 150° C., from 5° C. to 100° C., from 5° C. to 50° C., from 10° C. to 500° C., from 10° C. to 450° C., from 10° C. to 400° C., from 10° C. to 350° C., from 10° C. to 300° C., from 10° C. to 250° C., from 10° C. to 200° C., from 10° C. to 150° C., from 10° C. to 100° C., from 10° C. to 50° C., from 15° C. to 500° C., from 15° C. to 450° C., from 15° C. to 400° C., from 15° C. to 350° C., from 15° C. to 300° C., from 15° C. to 250° C., from 15° C. to 200° C., from 15° C. to 150° C., from 15° C. to 100° C., from 15° C. to 50° C., from 20° C. to 500° C., from 20° C. to 450° C., from 20° C. to 400° C., from 20° C. to 350° C., from 20° C. to 300° C., from 20° C. to 250° C., from 20° C. to 200° C., from 20° C. to 150° C., from 20° C. to 100° C., from 20° C. to 50° C., from 25° C. to 500° C., from 25° C. to 450° C., from 25° C. to 400° C., from 25° C. to 350° C., from 25° C. to 300° C., from 25° C. to 250° C., from 25° C. to 200° C., from 25° C. to 150° C., from 25° C. to 100° C., or from 25° C. to 50° C.).

In some embodiments, rate $r_2$ is greater than about 30° C./minute (e.g., of from about 30° C./minute to about 300° C./minute, such as from 35° C./minute to 300° C./minute, 35° C./minute to 250° C./minute, 35° C./minute to 200° C./minute, 35° C./minute to 100° C./minute, 35° C./minute to 90° C./minute, 35° C./minute to 80° C./minute, 40° C./minute to 300° C./minute, 40° C./minute to 250° C./minute, 40° C./minute to 200° C./minute, 40° C./minute to 150° C./minute, 40° C./minute to 100° C./minute, 40° C./minute to 90° C./minute, 40° C./minute to 80° C./minute, 50° C./minute to 300° C./minute, 50° C./minute to 250° C./minute, 50° C./minute to 200° C./minute, 50° C./minute to 150° C./minute, 50° C./minute to 100° C./minute, 50° C./minute to 90° C./minute, or 50° C./minute to 80° C./minute).

In any embodiment herein, the glass-ceramic composition includes of from about 65 wt. % to about 80 wt. % of $SiO_2$; from about 8 wt. % to about 16 wt. % of $Li_2O$; from about 2 wt. % to about 8 wt. % of $Al_2O_3$; from about 1 wt. % to about 8 wt. % of $K_2O$; from about 1 wt. % to about 5 wt. % of $P_2O_5$; from about 0.5 wt. % to about 7 wt. % of $B_2O_3$; from 0 wt. % to about 5 wt. % of ZnO; and from about 0.5 wt. % to about 5 wt. % of one or more metal oxidants (e.g., from about 1 wt. % to about 5 wt. %; and/or from about 0.2 mol. % to about 5 mol. %, such as from 0.25 mol. % to 5 mol. %, from 0.25 mol. % to 4 mol. %, from 0.25 mol. % to 3 mol. %, from 0.25 mol. % to 2 mol. %, from 0.25 mol. % to 1 mol. %, from 0.25 mol. % to 0.5 mol. %, 0.5 mol. % to 5 mol. %, from 0.5 mol. % to 4 mol. %, from 0.5 mol. % to 3 mol. %, from 0.5 mol. % to 2 mol. %, from 0.5 mol. % to 1 mol. %, 1 mol. % to 5 mol. %, from 1 mol. % to 4 mol. %, from 1 mol. % to 3 mol. %, from 1 mol. % to 2 mol. %, 2 mol. % to 5 mol. %, from 2 mol. % to 4 mol. %, and from 2 mol. % to 3 mol. %).

In yet another aspect, the invention features a glass-ceramic composition including: from about 65 wt. % to about 80 wt. % of $SiO_2$ (e.g., from 70 wt. % to 80 wt. %); from about 8 wt. % to about 16 wt. % of $Li_2O$ (e.g., from 12 wt. % to 14 wt. %); from about 2 wt. % to about 8 wt. % of $Al_2O_3$ (e.g., from 3 wt. % to 4.5 wt. %); from about 1 wt. % to about 8 wt. % of $K_2O$ (e.g., from 1.5 wt. % to 4 wt. %); from about 1 wt. % to about 5 wt. % of $P_2O_5$ (e.g., from 2.5 wt. % to 3.5 wt. %); from about 0.5 wt. % to about 7 wt. % of $B_2O_3$ (e.g., from 0.7 wt. % to 2.5 wt. %); and from about 0 wt. % to about 5 wt. % of ZnO (e.g., from 0.1 wt. % to 3 wt. %, such as 1 wt. % to 3 wt. %).

In any embodiment herein, the GC composition is formed from a GC mixture, which includes raw materials configured to provide components of the GC composition. In some embodiments, the GC mixture includes of from about 40 wt. % to about 90 wt. % of $SiO_2$ (e.g., from 50 wt. % to 80 wt. %); from about 10 wt. % to about 45 wt. % of $Li_2CO_3$ (e.g., from 10 wt. % to 30 wt. %); from about 1 wt. % to about 10 wt. % of $Al_2O_3$ (e.g., from 1 wt. % to 5 wt. %); from about 0.5 wt. % to about 15 wt. % of $K_2CO_3$ (e.g., from 2 wt. % to 10 wt. %); from about 0.5 wt. % to about 10 wt. % of $Li_3PO_4$ (e.g., from 2 wt. % to 10 wt. %); from about 0.5 wt. % to about 15 wt. % of $H_3BO_3$ (e.g., from 1 wt. % to 5 wt. %); from about 0.05 wt. % to about 6 wt. % of ZnO (e.g., from 1 wt. % to 5 wt. %); and from about 0.5 wt. % to about 5 wt. % of one or more metal oxidants.

In any embodiment herein, the composition further includes of from about 5 wt. % to about 30 wt. % of $SiO_2$ as a cristobalite phase (e.g., from 5 wt. % to 10 wt. %, 5 wt. % to 15 wt. %, 5 wt. % to 20 wt. %, 5 wt. % to 25 wt. %, 10 wt. % to 15 wt. %, 10 wt. % to 20 wt. %, 10 wt. % to 25 wt. %, 10 wt. % to 30 wt. %, 15 wt. % to 20 wt. %, 15 wt. % to 25 wt. %, 15 wt. % to 30 wt. %, 20 wt. % to 25 wt. %, 20 wt. % to 30 wt. %, and 25 wt. % to 30 wt. %).

In any embodiment herein, the composition further includes of from about 5 wt. % to about 30 wt. % of $SiO_2$ as a quartz phase (e.g., from 5 wt. % to 10 wt. %, 5 wt. % to 15 wt. %, 5 wt. % to 20 wt. %, 5 wt. % to 25 wt. %, 10 wt. % to 15 wt. %, 10 wt. % to 20 wt. %, 10 wt. % to 25 wt. %, 10 wt. % to 30 wt. %, 15 wt. % to 20 wt. %, 15 wt. % to 25 wt. %, 15 wt. % to 30 wt. %, 20 wt. % to 25 wt. %, 20 wt. % to 30 wt. %, and 25 wt. % to 30 wt. %).

In any embodiment herein, the ratio, by weight, of the cristobalite phase to the quartz phase (e.g., in the GC composition) is of from about 1:0.5 to about 1:2 (e.g., from 1:0.6 to 1:2, 1:0.7 to 1:2, 1:0.8 to 1:2, 1:0.9 to 1:2, 1:1 to 1:2, 1:1.1 to 1:2, 1:1.2 to 1:2, 1:1.3 to 1:2, 1:1.4 to 1:2, 1:1.5 to 1:2, 1:1.6 to 1:2, 1:1.7 to 1:2, 1:1.8 to 1:2, or 1:1.9 to 1:2)

In any embodiment herein, the quartz phase includes α-quartz and/or β-quartz. In other embodiments, the cristobalite phase includes α-cristobalite and/or β-cristobalite.

In any embodiment herein, a combined weight percentage for both the cristobalite phase and the quartz phase (e.g., in the GC composition) is of from about 10 wt. % to about 50 wt. % (e.g., from 10 wt. % to 15 wt. %, 10 wt. % to 20 wt. %, 10 wt. % to 25 wt. %, 10 wt. % to 30 wt. %, 10 wt. % to 35 wt. %, 10 wt. % to 40 wt. %, 10 wt. % to 45 wt. %, 15 wt. % to 20 wt. %, 15 wt. % to 25 wt. %, 15 wt. % to 30 wt. %, 15 wt. % to 35 wt. %, 15 wt. % to 40 wt. %, 15 wt.

% to 45 wt. %, 15 wt. % to 50 wt. %, 20 wt. % to 25 wt. %, 20 wt. % to 30 wt. %, 20 wt. % to 35 wt. %, 20 wt. % to 40 wt. %, 20 wt. % to 45 wt. %, 20 wt. % to 50 wt. %, 25 wt. % to 30 wt. %, 25 wt. % to 35 wt. %, 25 wt. % to 40 wt. %, 25 wt. % to 45 wt. %, 25 wt. % to 50 wt. %, 30 wt. % to 35 wt. %, 30 wt. % to 40 wt. %, 30 wt. % to 45 wt. %, 30 wt. % to 50 wt. %, 35 wt. % to 40 wt. %, 35 wt. % to 45 wt. %, 35 wt. % to 50 wt. %, 40 wt. % to 45 wt. %, 40 wt. % to 50 wt. %, and 45 wt. % to 50 wt. %).

In any embodiment herein, the composition further includes of from about wt. % to about 30 wt. % of $SiO_2$ as an amorphous phase (e.g., from 5 wt. % to 10 wt. %, 5 wt. % to 15 wt. %, 5 wt. % to 20 wt. %, 5 wt. % to 25 wt. %, 10 wt. % to 15 wt. %, 10 wt. % to 20 wt. %, 10 wt. % to 25 wt. %, 10 wt. % to 30 wt. %, 15 wt. % to 20 wt. %, 15 wt. % to 25 wt. %, 15 wt. % to 30 wt. %, 20 wt. % to 25 wt. %, 20 wt. % to 30 wt. %, and 25 wt. % to 30 wt. %).

In any embodiment herein, the composition further includes a near linear thermal strain, where the $R^2$ value of a linear fit to thermal strain data is greater than 0.99.

In any embodiment herein, the composition is provided as a glass-ceramic preform. In other embodiments, the composition is provided as a glass-ceramic seal.

Definitions

As used herein, the term "about" means +/−10% of any recited value. As used herein, this term modifies any recited value, range of values, or endpoints of one or more ranges.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

The present invention relates to seals and methods to add metal oxidants to glass-ceramic (GC) formulations (e.g., a $Li_2O$—$B_2O_3$—$K_2O$—$Al_2O_3$—$SiO_2$—$ZnO$—$P_2O_5$ composition) for sealing to a metal (e.g., stainless steel (SS)). In one instance, the metal oxidants serve as oxidation agents to oxidize Mn and Cr in SS and form interfacial bonding oxides (e.g., $MnCr_2O_4$ and/or $Cr_2O_3$) via a reduction-oxidation (redox) process. The reduced metals precipitate in GC next to the bonding oxides and confine the bonding oxides to the interface.

Any useful metal oxidant can be employed. In one instance, the selection criteria for the metal oxidant (i.e., oxidation agents) are that the changes of Gibbs free energy for their oxidation reactions are lower than the change of Gibbs free energy of forming $P_2O_5$, allowing thermodynamically favorable reduction of these agents over $P_2O_5$ during GC-SS interfacial reactions. $P_2O_5$ is thus preserved to form $Li_3PO_4$ crystals, which are nuclei for homogeneous growth of $Li_2SiO_3$, $Li_2Si_2O_5$, and cristobalite crystal ($SiO_2$) in the GC. Examples of selected oxidation oxides added to GC formulation include, but are not limited to, cobalt oxide (e.g., CoO), nickel oxide (e.g., NiO), lead oxide (e.g., PbO), copper oxide (e.g., CuO), and silver oxide (e.g., AgO), as well as combinations thereof.

Figure 1:
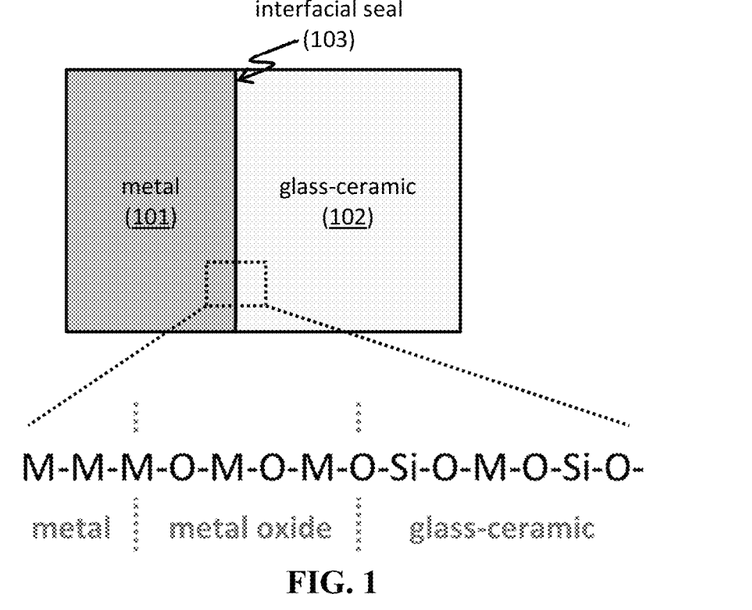
FIG. 1 provides a schematic of an exemplary interfacial seal 103 between a metal component 101 and a glass-ceramic component 102.

FIG. 1 shows a schematic of an exemplary interfacial seal 103 formed between a metal component 101 and a glass-ceramic (GC) component 102. The metal oxidant present in the GC component reacts with one or more active reducing metal agents (e.g., Si, Mn, and/or Cr) present in the metal component, thereby forming a seal having a metal oxide.

The seal can be formed in any useful manner. In one instance, a GC component (e.g., a GC component, a raw mixture configured to provide any GC composition described herein) is contacted with a metal component and then heated to a sealing temperature (e.g., a temperature $T_1$, such as any herein). Then, the components can be cooled to form one or more nuclei, promote one or more crystallization phases, as well as to complete bulk crystallization.

Figure 2:
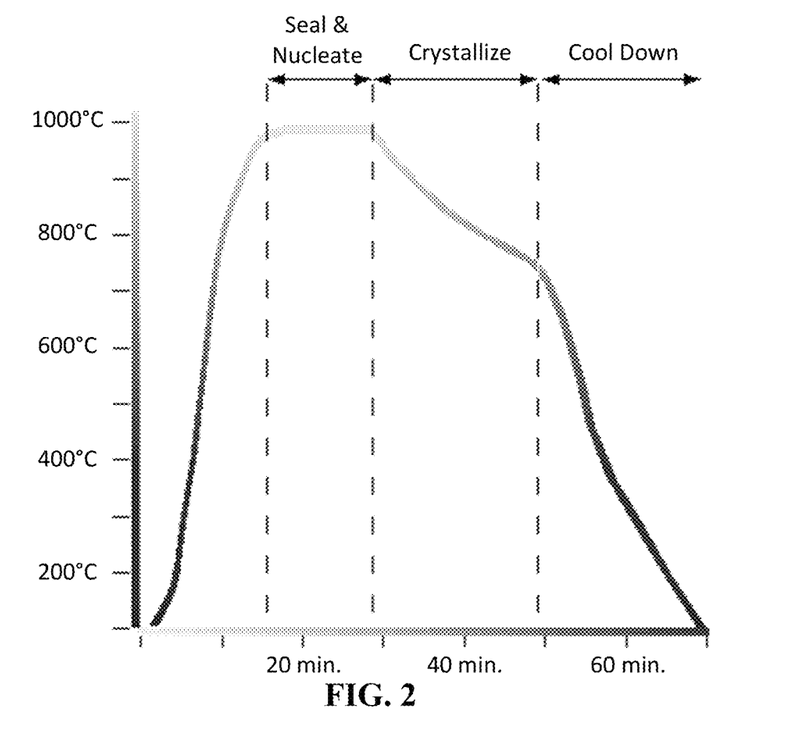
FIG. 2 is a graph of an exemplary GC-SS sealing profile.

FIG. 2 shows a representative thermal cycle for sealing a BPS glass-ceramic. The duration of the seal and nucleate segment controls the number and size of $Li_3PO_4$ crystallites. Crystalline $Li_2SiO_3$ and high expansion cristobalite grow preferentially on the $Li_3PO_4$ facets during the crystallization stage. The size and volume percentage of cristobalite, and thus the overall CTE of the GC, are controlled by the cooling rate from 1000° C. to 750° C. Lower cooling rate allows for growth of more high expansion cristobalite while higher rate undercuts the crystal growth. The BPS thus has a "tunable" CTE, ranging from ~17 ppm/° C. at a cooling rate of 6.5° C./min, to 16 ppm/° C. at a 10.5° C./min, and ~15 ppm/° C. at 20° C./min.

The typical peak melting temperature and time of BPS GC is 900° C.-1000° C. and 10 minutes. Upon heating, lithium metasilicate ($Li_2SiO_3$) forms at 620° C. At 800° C., $Li_2SiO_3$ reacts with excess Si and forms lithium disilicate ($Li_2Si_2O_5$). At 890° C., the GC starts to melt and $Li_2Si_2O_5$ dissolves to form a liquid from which the nucleating crystals, lithium orthophosphate ($Li_3PO_4$) grow via Ostwald ripening (see, e.g., Hammetter W F et al., "Crystallization kinetics of a complex lithium silicate glass-ceramic," *J. Am. Ceram. Soc.* 1987; 70(8):577-82). It is during the 1000° C. isothermal segment of the heat treatment that the number and size of the $Li_3PO_4$ crystals is established (see, e.g., Headley T J et al., "Crystallization of a glass-ceramic by epitaxial growth," *J. Am. Ceram. Soc.* 1984; 67(9):620-5). The $Li_3PO_4$ crystals could grow up to 1 μm in size and subsequently serve as nucleation agents for the growth of $Li_2SiO_3$ and high expansion crystalline silica phases. Upon cooling from 100° C. to 750° C., bulk crystallization of $Li_2SiO_3$ and cristobalite $SiO_2$ over the $Li_3PO_4$ nuclei occurs within the S-GC. Details of the nucleation and crystallization in BPS GC could be found in work by Headley and Loehman (see, e.g., Headley T J et al., "Crystallization of a glass-ceramic by epitaxial growth," *J. Am. Ceram. Soc.* 1984; 67(9):620-5; and Loehman R E et al., "Design of high thermal expansion glass-ceramics through microstructural control," in *Ceramic Microstructures '86* (*Materials Sciences Research Volume* 21), eds. J. A. Pask and A. G. Evans, New York and London: Plenum Press, 1987, pp. 33-43).

Metal Oxidants

The glass-ceramic composition can include one or more metal oxidants. In particular embodiments, the metal oxidant is from Group I from Table 1 below. In other embodiments, the metal oxidant is cobalt oxide (e.g., CoO), nickel oxide (e.g., NiO), lead oxide (e.g., PbO), copper oxide (e.g., CuO or $Cu_2O$), silver oxide (e.g., AgO or $Ag_2O$), iron oxide (e.g., FeO, or $Fe_3O_4$, or $Fe_2O_3$), molybdenum oxide (e.g., $MoO_3$ or $MoO_2$), tungsten oxide (e.g., $WO_2$ or $WO_3$), and tin oxide (e.g., $SnO_2$), as well as combinations thereof.

TABLE 1

Standard Gibbs Free Energy per Mole of $O_2$

| Oxidation Reaction | Gibbs Free Energy (ΔG°, kJ/mol $O_2$, 25° C.) | Note |
| --- | --- | --- |
| $4Ag + O_2 = 2Ag_2O$ | −22 | Group 1: |
| $2Cu_2O + O_2 = 4CuO$ | −219 | Candidates for dopant |
| $2MoO_2 + O_2 = 2MoO_3$ | −275 | oxides in GC as |
| $4Cu + O_2 = 2Cu_2O$ | −289 | oxidants for preferred |

TABLE 1-continued

Standard Gibbs Free Energy per Mole of $O_2$

| Oxidation Reaction | Gibbs Free Energy (ΔG°, kJ/mol $O_2$, 25° C.) | Note |
| --- | --- | --- |
| $2Pb + O_2 = 2PbO$ | −379 | reduction over $P_2O_5$ |
| $2Co + O_2 = 2CoO$ | −425 | to form interfacial |
| $2Ni + O_2 = 2NiO$ | −430 | bonding oxides by |
| $⅔Mo + O_2 = ⅔MoO_3$ | −445 | redox |
| $2Fe + O_2 = 2FeO$ | −482 | |
| $⁴⁄₃Fe + O_2 = ⅔Fe_2O_3$ | −495 | |
| $2W + O_2 = WO_2$ | −505 | |
| $⅔W + O_2 = ⅔WO_3$ | −509 | |
| $Mo + O_2 = MoO_2$ | −530 | |
| $Sn + O_2 = SnO_2$ | −535 | |
| $6FeO + O_2 = 2Fe_3O_4$ | −549 | |
| $⅘P + O_2 = 2/5P_2O_5$ | −572 | Group 2: |
| $2Zn + O_2 = 2ZnO$ | −636 | Existing oxidants in GC |
| $⁴⁄₃Cr + O_2 = ⅔Cr_2O_3$ | −695 | Group 3: |
| $2Mn + O_2 = 2MnO$ | −726 | Alloying elements in |
| $Si + O_2 = SiO_2$, quartz | −856 | SS as reducing agents |
| $Si + O_2 = SiO_2$, cristobalite | −856 | |
| $Si + O_2 = SiO_2$, tridymite | −855 | |
| $Si + O_2 = SiO_2$, quartz glass | −851 | |

Glass-Ceramic Composition

The glass-ceramic material can be any useful composition. In one embodiment, the GC composition includes a final composition of $SiO_2$ (e.g., 65-80 wt. %), $Li_2O$ (e.g., 8-16 wt. %), $Al_2O_3$ (e.g., 2-8 wt. %), $P_2O_5$ (e.g., 1-5 wt. %), $K_2O$ (e.g., 1-8 wt. %), $B_2O_3$ (e.g., 0.5-7 wt. %), and ZnO (e.g., 0.1-5 wt. %). High-strength seals can also be made using 304 stainless steel as well as nitronic stainless steel in the metal housing or casing and other stainless steel alloys with the disclosed glass-ceramic of the present invention by belt processing. Additional materials include belt processable S-glass (BPS) (e.g., including $Li_2O$—$SiO_2$—$Al_2O_3$—$K_2O$—$B_2O_3$—$P_2O_5$—ZnO, as described in U.S. Pat. No. 5,820,989), S glass (e.g., including $Li_2O$—$SiO_2$—$Al_2O_3$—$K_2O$—$B_2O_3$—$P_2O_5$, as described in U.S. Pat. No. 4,414,282), or SB glass (S glass with a lower boron content), as well as any material described in U.S. Pat. Nos. 4,414,282 and 5,820,989, each of which is incorporated herein by reference in its entirety. Table 2 shows an exemplary composition, as well as minimum and maximum wt. %, for S, SB, and BPS glasses.

TABLE 2

Exemplary composition of BPS GC and S GC

| Oxide | S glass (wt. %) | | | SB glass (wt. %) | | | BPS glass (wt. %) | | |
| --- | --- | --- | --- | --- | --- | --- | --- | --- | --- |
| | Min | Max | Target | Min | Max | Target | Min | Max | Target |
| $SiO_2$ | 65 | 80 | 71.7 | 71.5 | 78 | 74.32 | 65 | 80 | 74.1 |
| $Li_2O$ | 8 | 16 | 12.6 | 11 | 14 | 13.02 | 8 | 16 | 12.7 |
| $Al_2O_3$ | 2 | 8 | 5.1 | 4 | 5 | 4.66 | 2 | 8 | 3.8 |
| $K_2O$ | 1 | 8 | 4.9 | 4 | 5 | 4.04 | 1 | 8 | 2.95 |
| $B_2O_3$ | 1.5 | 7.0 | 3.2 | 1 | 1.5 | 1.38 | 0.5 | 7 | 1.2 |
| $P_2O_5$ | 1 | 5 | 2.5 | 2 | 3 | 2.58 | 1 | 5 | 3.15 |
| ZnO | — | — | — | — | — | — | 0 | 5 | 1.85 |

The GC composition can be formed from raw materials that are functionally equivalent to the components present in the final composition. For instance, functionally equivalent raw materials include phosphates, carbonates, borates, lithium forms, etc. of any of the components described herein for the GC composition. In one example, the GC composition herein includes from about 8 wt. % to about 16 wt. % of $Li_2O$, which can be introduced as a raw material that is a carbonate form of the $Li_2O$ component (e.g., as a $Li_2CO_3$ raw material). Other raw materials include carbonate forms of $K_2O$ (e.g., $K_2CO_3$ raw materials); lithium forms of $P_2O_5$ (e.g., $Li_3PO_4$ raw materials); as well as borate forms of $B_2O_3$ (e.g., $H_3BO_3$ raw materials).

Applications

GC compositions can be used in numerous applications. For instance, GC-to-metal seals can be useful for electrical connections (e.g., in co-axial single pin or multiple-pin connectors, headers, as described in U.S. Pat. Nos. 4,414,282 and 8,082,663, which is incorporated herein by reference in its entirety). Electrical connectors with hermetic seals are used in aerospace applications, such as communications satellites, microwave communications equip, and military communications and radar systems; the automotive industry; and commercial communications.

GC-to-metal seals can include any useful metal. Exemplary metals include a conductive metal, stainless steel (e.g., 304L, 330, or 333 stainless steel), nitronic steel, palladium, gold, silver, copper, nickel, titanium, molybdenum, chrome, iron, chromium, manganese, silicon, cobalt, aluminum, carbon, as well as alloys thereof (e.g., a silver-copper nickel alloy, and a nickel-molybdenum chrome alloy (Hastelloy C-276, Inconel 625, or Inconel 718)). Table 3 shows an exemplary composition for 304L stainless steel.

TABLE 3

Exemplary composition of 304L stainless steel

| Element | Wt. % | Element | Wt. % |
|---|---|---|---|
| Fe | 67.41 | S | 0.003 |
| Cr | 19.49 | P | 0.018 |
| Ni | 10.34 | C | 0.017 |
| Mn | 1.77 | Nb | 0.017 |
| Si | 0.62 | N | 0.01 |
| Cu | 0.13 | Al | 0.006 |
| Mo | 0.12 | Ti | 0.002 |
| Co | 0.05 | O | 0.001 |

Such metals can be of any useful form, such as a pin, a housing, a casing, etc. In one embodiment, the metal pin is a commercially available pin, referred to as a Paliney® 7 pin, with the approximate composition of 34% Pd, 30% Ag, 10% Pt, 10% Au, 15% Cu, and less than 1% Zn. In another embodiment, the metal pin is a commercially available pin, referred to as a Paliney® 6 pin, with the approximate composition of 43-45% Pd, approximately 37-39% Ag, approximately 0.8-1.2% Pt, approximately 15-17% Cu, and less than or equal to 1.2% Ni. In one embodiment, these pins have a hardness of greater than or equal to 300 Knoop after heat treatment incorporated into the sealing cycle. The metal pin can also be comprised of 330 or 333 stainless steel.

GC-to-metal seals can be characterized and tested in any useful manner, including sessile drop tests to characterize surface tension and wetting behavior; bonding tests, by way of measuring adhesion strength; and/or general morphology and element mapping by scanning electron microscopy (SEM).

EXAMPLES

Example 1: Design Strategy for Forming GCtSS Seals

Interfacial seals between a GC component and a SS component can be difficult to form. In particular, complex reaction dynamics occur at the interface between the GC and SS components. If the GC component includes a lithium silicate-based composition, then active oxidation agents include $P_2O_5$ and/or ZnO. In a stainless steel metal, one or more active reducing agents include Si, Mn, and Cr.

In the absence of other energetically preferential reactions, the active oxidation agents and active reducing agents will react during typical sealing conditions, thereby producing oxidized reducing agents (e.g., oxidized Si, Mn, and/or Cr) and reduced oxidation agents (e.g., reduced $P_2O_5$). Lithium silicate-based glass-ceramics with high coefficients of thermal expansion, designed to form matched hermetic seals in 304L stainless steel housing, show little evidence of interfacial chemical bonding, despite extensive inter-diffusion at the glass-ceramic-stainless steel (GC-SS) interface.

Retention of $P_2O_5$ nucleic within the GC composition can provide numerous benefits. In one instance, such $P_2O_5$ nuclei can be the source of $Li_3PO_4$ in the GC phase, in which $Li_3PO_4$ in turn serves as a nucleation agent for beneficial crystalline phases in GC (e.g., beneficial high CTE cristobalite $SiO_2$ phases, lithium silicate ($Li_2SiO_3$) phases, and lithium disilicate ($Li_2Si_2O_5$) phases.

To retain $P_2O_5$ nucleic within the GC composition, the GC composition can be modified with one or more metal oxidants to ensure that reaction of the metal oxidant is thermodynamically favorable, as compared to reaction of the $P_2O_5$ agent. Particular parameters include a concentration of the metal oxidant in the GC component, a combination of two or more metal oxidants (e.g., a combination of a copper oxide and a cobalt oxide, or a combination of a copper oxide and a lead oxide), as well as mobility of the metal ions (from the metal oxidant) in the GC phase via bulk diffusion.

Metal oxidants can be selected from those that, according to their Gibbs free energy, allow for oxidation of Si, Mn, and/or Cr from stainless steel, and yet to prevent a reduction of $P_2O_5$ in the glass-ceramic composition. Accordingly, a series of glass-ceramic compositions were modified with a variety of oxidants (e.g., AgO, FeO, NiO, PbO, SnO, CuO, CoO, $MoO_3$, and $WO_3$) and then examined for the feasibility of forming bonding oxides through reduction-oxidation (redox) at the GC-SS interface. Additional details are provided in the following Examples.

Example 2: Modified Glass-Ceramic Compositions Based on BPS Formulation

Lithium silicate glass-ceramics, usually modified with a small amount of other oxides (for example, $K_2O$, $B_2O_3$, $Al_2O_3$, ZnO, and often $P_2O_5$ as the high temperature nucleating agent) have been extensively used for sealing electrical feedthroughs in metal housings (see, e.g., Fluegel A, "Thermal expansion calculation for silicate glasses at 210° C. based on a systematic analysis of global databases," *Glass Technology—Eur. J. Glass Sci. Technol. A* 2010; 51(5):1191-201; and Donald I W, "Glass-to-metal seals," Sheffield, UK: Society of Glass Technology, 2009). Glass-ceramic-to-metal (GCtM) seals combine the ease of conventional glass-to-metal (GtM) seals, as well as the performance often achieved in ceramic-to-metal (CtM) seals. The GCtM seals in particular offer several distinct advantages: high temperature mechanical strength of the seals, high dielectric breakdown strength for greater electrical isolation, good hermeticity for environmental protection, and long-term reliability. These unique properties enable GCtM seals to be widely adopted in high performance components and systems that are often deployed in extreme environments.

The interfacial reactions between the GC-SS have been characterized (see, e.g., Donald I W, "Preparation, properties and chemistry of glass- and glass-ceramic-to-metal seals and coatings," *J. Mater. Sci.* 1993; 28:2841-86; Knorovsky G A et al., "Interfacial debonding in stainless steel/glass ceramic seals," Sandia Report No. SAND89-1866C, Albuquerque: Sandia National Laboratories; 1989; Loehman R E, "Processing and interfacial analysis of glass-ceramic to metal seals," in *Technology of glass, ceramic, or glass-ceramic to metal sealing* (eds. WE Moddeman, C W Merten, and DP Kramer), American Society of Mechanical Engineers:1987, vol 4, pp. 39-46; Watkins R D et al., "Interfacial reaction between a complex lithium silicate glass-ceramic to metal seals," *Adv. Ceram. Mater.* 1986; 1(1):77-80; Donald I W et al., "Interfacial reactions in glass-ceramic-to-metal seals," *J. Am. Ceram. Soc.* 2008; 91(3):715-20; Kunz S C et al., "Thermal expansion mismatch produced by interfacial reactions in glass-ceramic to metal seals," *Adv. Ceram. Mater.* 1987; 2(1):69-73; Bengisu M et al., "Interfacial reactions between lithium silicate glass-ceramics and Ni-based superalloys and the effect of heat treatment at elevated temperatures," *J. Mater. Sci.* 2004; 39:605-18; and Loehman R E, "Interfacial reaction in ceramic-metal systems," *Ceram. Bull.* 1989; 68(4):891-6).

Figure 3:
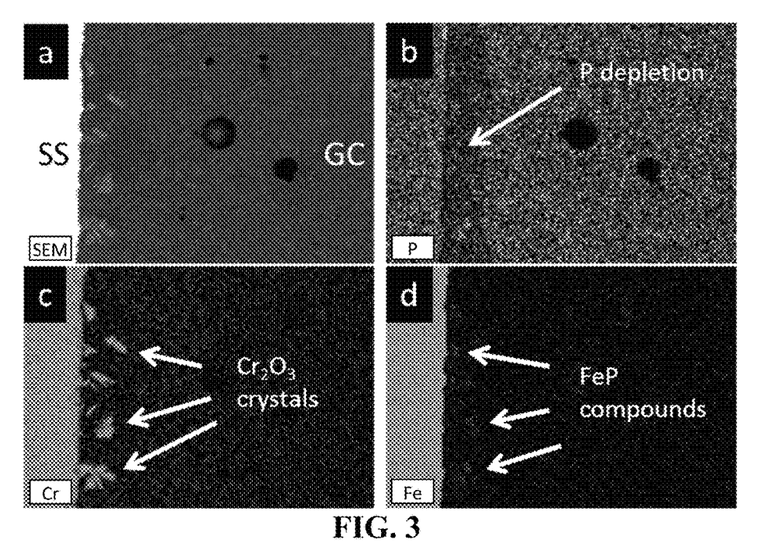
FIG. 3 shows SEM cross-section images of an exemplary GC-SS interface, including (a) grey image, (b) P map, (c) Cr map, and (d) Fe map.

In part, during the sealing process, Cr diffuses rapidly into the glass-ceramic and is oxidized to form $Cr_2O_3$ crystals positioning in the glass-ceramics as deep as several tens of μm from the GC-SS interface. Iron phosphate (Fe—P) compounds, due to iron diffusion into the glass-ceramic, are also observed, often next to or coexisting with the $Cr_2O_3$ crystals. On the other hand, a reduction of $P_2O_5$ in the glass-ceramic, as well as an accumulation of P near the GC-SS interface, are also observed. FIG. 3a is a SEM cross section image of a GC-SS interface.

There is a distinct P depletion band along the GC-SS interface in the mapping of P (FIG. 3b). Several high P concentration areas indicate a clustering of P in the depletion band, as well as an accumulation of P at the GC-SS interface. The light-colored crystals in glass-ceramic next to the GC-SS boundary in FIG. 3a clearly correlates to the $Cr_2O_3$, as confirmed by the Cr mapping in FIG. 3c. The size of the $Cr_2O_3$ crystals is about 10~20 μm. In the SEM image, the $Cr_2O_3$ crystals exist at up to 40 μm into the glass-ceramic from the interface. In addition, a distance as far as 100 μm has also been observed. A close inspection of the Fe mapping in FIG. 3d shows the co-existence of Fe and P clusters, which were further verified by high magnification SEM images as Fe—P compounds. The compounds are generally seen in close proximity of the $Cr_2O_3$ crystals.

One of the fundamental driving force for the GC-SS interface reactions is the thermodynamically favorable reduction-oxidation (redox), where $P_2O_5$ serves as an oxidation agent and the Cr/Mn/Si is the reduction element. Table 1 lists standard Gibbs free energies in descending value for the formation of common oxides relevant to this study. Group 1 lists candidate oxides for glass-ceramic modification (discussed in the experiment procedure section). It is clear that the Gibbs free energy of $Cr_2O_3$, MnO, and all $SiO_2$ polymorphs in group 3, representing oxides of metal elements from stainless steel, are lower than those of group 2 $P_2O_5$ and ZnO in glass-ceramic. The difference in the Gibbs free energy is the driving force of the redox at the GC-SS interface, with the Group 2 oxides being reduced for oxidation of metal elements in Group 3.

During GCtSS sealing, the Cr, Mn, and Si in stainless steel are readily oxidized as part of the interfacial redox reaction(s). However, Cr becomes the dominant reducing agent due to its high weight percentage. In the glass-ceramic, only $P_2O_5$ and ZnO could serve as the oxidation agents, but the reduction of $P_2O_5$ is much more thermodynamically favorable over that of ZnO. Iron diffusion from stainless steel into glass-ceramic is common in GCtM seals. However, in the current GC-SS system, the iron appears to combine to the reduced phosphor to form Fe—P compounds as the formation of $Fe_2O_3$ is thermodynamically unfavorable due to the relatively higher Gibbs free energy of $Fe_2O_3$ (Table 1).

Due to the depletion of P and thus, the inadequate formation of the $Li_3PO_4$ nuclei in the glass-ceramic near the interface, a very course microstructure with large LS crystals are seen in the area. The region with P depletion and abnormal crystal growth is designated as the reaction zone in the glass-ceramic. In general, the CTE of the reaction zone is lower than the CTE of the bulk glass-ceramic. Furthermore, the low CTE reaction zone may lead to tensile stress in the glass-ceramic and could contribute, in part, to interfacial separation.

Figure 4:
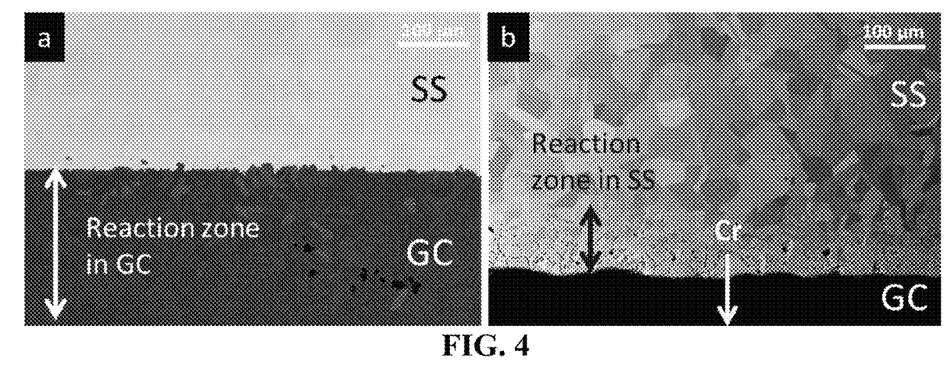
FIG. 4 shows (a) an amplified SEM view of the reaction zone in GC and (b) an electron back scattering image showing the Cr-depleted reaction zone in SS.

In the stainless steel, the depletion of Cr was found to be concentrated within 2~3 μm from the interface. FIG. 4a-b show SEM cross sections of the GC-SS interface with a tapered cut and polish. The angle between the GC-SS interface and the polishing plane was 8°. The shallow polishing angle allowed an expanded view of the reaction zones with an amplification factor of about 7.2. Multiple $Cr_2O_3$ crystals are clearly visible in the reaction zone in the glass-ceramic in FIG. 4a. The white needle-like spots on or near some $Cr_2O_3$ crystals are Fe—P compounds. The electron back-scattering (EBS) image on the stainless steel in FIG. 4b shows well defined grains in bulk stainless steel but a very different morphology of the reaction zone near the interface. Voids in grains and depleted grain boundaries exist throughout the reaction zone. Previous XRD work on the Cr depletion zone in stainless steel suggested the structure was body-centered cubic (bcc) at room temperature while the bulk stainless steel is face-centered cubic (fcc) (see, e.g., Susan D F et al., "Surface alloy depletion and martensite formation during glass to metal joining of austenitic stainless steels," *Sci. Technol. Welding Joining* 2012; 17(4):321-32; and Donald I W, "Glass-to-metal seals," Sheffield, UK: Society of Glass Technology, 2009). The thin bcc layer, it was suggested, was formed on cooling from a high temperature fcc structure as a result of martensitic phase transformation in low Cr steels. The large volume change associated with the fcc-bcc phase transformation was believed detrimental to GC-SS seals because it produced higher stresses and a change of CTE near the interface (see, e.g., Knorovsky G A et al., "Interfacial debonding in stainless steel/glass ceramic seals," Sandia Report No. SAND89-1866C, Albuquerque: Sandia National Laboratories).

One critical observation from all of the cross-sectional SEM images is the lack of chemical bonding, defined as an interfacial oxide adhesion layer, between the glass-ceramic and stainless steel. Despite the penetration of glass into the small pores and fine grain boundaries in the stainless steel and the inter-diffusion between the two materials, there is no evidence pointing to the existence of a distinct and continuous redox induced oxide layer at the interface.

It is well recognized that from a chemical or molecular approach, bonding must be accomplished by a transition zone in which the metallic bonding of the metal is gradually substituted for the ionic-covalent bonding of the glass (see, e.g., Bauleke M P et al., "How to solve the problems of body cracking and glaze popping in stoneware bodies," *Kansas Geological Survey* 1978 April; bulletin 211 (part 4):23-7). FIG. 1 illustrates the concept where a metal oxide layer is formed inside glass near the metal-glass interface. Strong chemical bonding can be achieved between a metal and a glass only if the conditions during bonding are such that the glass at the interface becomes and remains saturated with the appropriate metal oxide. Any effects that disrupt and erode this process may negatively impact the quality of the bond. It is worth noting that strong chemical bonds may not form either when there is no such metal oxide present or when the metal oxide diffuses far into the glass without saturation at the interface.

The formation of interfacial oxides requires a source of oxygen. However, the atmosphere for GCtSS sealing needs to be inert, normally a flowing $N_2$ or Ar gas, to prevent oxidation of the stainless steel. In addition, the graphite, as the most common fixture material to avoid sticking to glasses and glass-ceramics, is chemically reducing in nature. For a GC-SS seal assembly held in graphite fixtures, there is essentially no oxygen available in the local atmosphere surrounding the glass-ceramics throughout a sealing cycle. These competing requirements, a need for oxygen to form an interfacial oxide bonding layer and a lack of oxygen inside the graphite fixture, limit the choice of forming bonding oxides to essentially two approaches: 1) pre-oxidation of SS to form surface oxides, typically $C_2O_3$, $MnCr_2O_4$ spinel and $SiO_2$ for 304L type stainless steel; or 2) doping of glass-ceramic with oxides to serve as oxidants to enable the interface redox reaction to form the bonding oxides. Herein, we focused on the second scenario, where pre-oxidation of the stainless steel housing is not an option, or it is undesirable in real applications.

The goal of modifying glass-ceramics is to add metal oxidants as "sacrificial" oxides, which could be reduced preferably over the $P_2O_5$ to preserve $P_2O_5$ for the formation of $Li_3PO_4$ nuclei. At the same time, the reduced metal may accumulate in glass-ceramic at the interface to form a barrier to block the diffusion of Cr and Fe from the stainless steel. In principle, any oxidants having higher Gibbs free energy (for example, the oxides in Group 1 in Table 1) than that of $P_2O_5$ could serve the purpose. The criteria for a viable modification of glass-ceramic are the following, in one non-limiting instance: 1) the metal oxidants could be reduced, preferably over $P_2O_5$; 2) the metal ions of the dopants have the mobility to quickly diffuse to the interface; so kinetically, the redox is feasible; and 3) the metal oxidants need to be reduced at the GC-SS interface for redox reaction rather than at the free surfaces of the glass-ceramic because of the inert sealing atmosphere or even a reducing atmosphere inside the graphite fixture.

A standard method to form modified GCs is to co-melt all raw materials, including dopant (e.g., metal oxidants), in a single melt to produce glass frits or ribbons for further fabrication of preforms. This fabrication route of modified GCs is designated as co-melted and was adapted as the main method of making modified GCs described herein. Of course, other methods can be employed to form modified GCs including one or more metal oxidants. For instance, an alternative to form modified GCs is to mix powder of the same dopants with that of the base GC, designated as co-mixed, and form preforms thereafter. The co-mixed approach was validated in limited trails, where the partially molten GC dissolved the dopant metal oxide(s) in pre-sintering of the PPPs. The bonding and interfacial reactions of the co-mixed GCs appeared to be the same as those from the co-melted GCs.

The actual selection of oxides for glass-ceramic modification was based on multiple factors, including the Gibbs free energy, ease of processing the glass-ceramic, cost, and the environmental, safety and health (ESH) impact. Each glass-ceramic composition was batched at 1.5 kg weight. The mixed raw oxide materials were melted in a platinum crucible at 1550° C. with extensive stirring. The molten glass was cast to disc ingots at a diameter about 2 inches and thickness 0.25 to 0.50 inch. All modified glass-ceramics were fabricated by Ceradyne Viox Inc. (Seattle, Wash., USA), which is now a division of 3M Corp.

Table 4 provides modified glass-ceramic compositions based on the BPS formulation. Each added oxide was balanced by the same weight reduction on $SiO_2$.

TABLE 4

Modified glass-ceramic compositions based on BPS formulation

| Oxides | BPS_base (wt. %) | BPS_Zn (wt. %) | BPS_Co1 (wt. %) | BPS_Co2 (wt. %) | BPS_Cu1 (wt. %) | BPS_Cu2 (wt. %) |
| --- | --- | --- | --- | --- | --- | --- |
| $SiO_2$ | 74.35 | 72.2 | 73.98 | 73.61 | 72.95 | 72.35 |
| $Li_2O$ | 12.70 | 12.7 | 12.64 | 12.57 | 12.55 | 12.7 |
| $Al_2O_3$ | 3.80 | 3.8 | 3.78 | 3.76 | 3.79 | 3.8 |
| $K_2O$ | 2.95 | 2.95 | 2.94 | 2.92 | 3.00 | 2.95 |
| $B_2O_3$ | 1.20 | 1.2 | 1.19 | 1.19 | 1.17 | 1.2 |
| $P_2O_5$ | 3.15 | 3.15 | 3.13 | 3.12 | 3.27 | 3.15 |
| ZnO | 1.85 | 4.0 | 1.84 | 1.83 | 1.85 | 1.85 |
| CoO | | | 0.5 | 0.99 | | |
| CuO | | | | | 1.41 | 2.0 |

In Table 4, the BPS_Zn, with more than double the wt. % of the original ZnO, was designed to study whether the extra ZnO could enhance the redox reaction with Cr from stainless steel. The idea was to test whether the relative higher wt. % of ZnO could shield P in glass-ceramic, although thermodynamically, the reduction of $P_2O_5$ is more favorable. An analogy is the preferred oxidation of Cr over Mn and Si from stainless steel due to the high weight percentage of Cr, although the formation of $Cr_2O_3$ was less thermodynamically favorable. The BPS_Co1 and BPS_Co2 with 0.50 and 0.99 wt. % CoO were fabricated because the Gibbs free energy of CoO is lower than that of $P_2O_5$. In addition, the small amount of CoO doping was one of the most commonly used methods to promote the adhesion of glass and glass ceramics to metals. The CuO modification was attractive due to the even lower formation energy of CuO, as compared to CoO.

Figure 5:
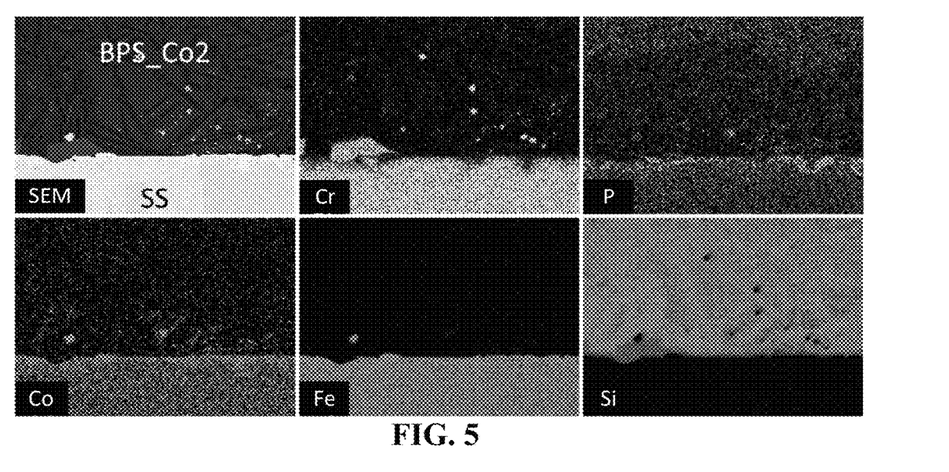
FIG. 5 shows SEM images and element mapping of an interface between a SS pin and a BPS_Co2 composition (see Table 4 for the wt. % composition of the BPS_Co2 composition).

Images of SEM cross section and element mapping of BPS_Co2 and SS pin are shown in FIG. 5. A reaction zone in the GC was observed next to interface, which was characterized by a coarser crystalline structure, as compared to the much finer crystalline structure in the bulk GC. In addition, we observed Cr diffusion from SS, as well as formation of $Cr_2O_3$ at the GC-SS boundary and in the GC. While the $Cr_2O_3$ in GC may not contribute to the adhesion, the $Cr_2O_3$ at the interface could promote adhesion. There also appears to be metallic Cr in the BPS_Co2 GC, which was not seen in BPS GC. P depletion was present in the GC reaction zone, and an accumulation of P was observed at the interface. The reduction of $P_2O_5$ could be a source for oxidation of Cr, similar to what occurred in regular BPS GC-SS interface. Finally, reduction of CoO to metallic Co and CoFe alloys were observed in the reaction zone. Co was also observed to accumulate in SS near the interface. It appeared that the intended CoO redox occurred at the GC-SS interface, and helped the GC to SS adhesion. However, the CoO did not shield $P_2O_5$ from being reduced. The reaction zone in GC with coarse microstructure still existed due to a depletion of P.

Modified glass-ceramics based on SB glass-ceramic are listed in Table 5. All of the dopant metal oxidants belong to Group 1 in Table 1 and have higher Gibbs free energy than that of $P_2O_5$. The amount of oxide was fixed at 1 mol. % with an exception of CoO modified glass-ceramics, where a composition with 2 mol. % CoO was fabricated.

TABLE 5

Modified glass-ceramic compositions based on SB formulation

| Oxides | SB_Pb (wt. %) | SB_Ni (wt. %) | SB_Fe (wt. %) | SB_Ag (wt. %) | SB_Sn (wt. %) | SB_W (wt. %) | SB_Mo (wt. %) | SB_Co1 (wt. %) | SB_Co2 (wt. %) |
|---|---|---|---|---|---|---|---|---|---|
| $SiO_2$ | 72.81 | 74.74 | 74.78 | 74.09 | 73.95 | 72.71 | 73.83 | 74.74 | 73.47 |
| $Li_2O$ | 12.3 | 12.62 | 12.63 | 12.51 | 12.49 | 12.28 | 12.47 | 12.62 | 12.59 |
| $Al_2O_3$ | 3.72 | 3.82 | 3.82 | 3.78 | 3.78 | 3.71 | 3.77 | 3.82 | 3.81 |
| $K_2O$ | 2.94 | 3.02 | 3.02 | 3.00 | 2.99 | 2.94 | 2.98 | 3.02 | 3.01 |
| $B_2O_3$ | 1.15 | 1.18 | 1.18 | 1.17 | 1.17 | 1.15 | 1.16 | 1.18 | 1.18 |
| $P_2O_5$ | 3.2 | 3.29 | 3.29 | 3.26 | 3.25 | 3.20 | 3.25 | 3.29 | 3.28 |
| Dopant | 3.88 | 1.33 | 1.28 | 2.19 | 2.38 | 4.02 | 2.53 | 1.34 | 2.66 |
| Note | 1 mol. % PbO | 1 mol. % NiO | 1 mol. % FeO | 1 mol. % AgO | 1 mol. % SnO | 1 mol. % $WO_3$ | 1 mol. % $MoO_3$ | 1 mol. % CoO | 2 mol. % CoO |

In particular, the CoO-modified glass-ceramics demonstrated improved GC-SS bonding. But the low mobility of $Co^{++}$ ions in the GC limited the amount of CoO that can diffuse to and participate in redox at the interface.

Example 3: CuO-Modified Glass Ceramics

The CuO-doped glass-ceramics were formulated at a finer scale. Table 6 shows a formulation of base SB glass-ceramic and the compositions up to 1 mol. % CuO at an increment of 0.25 mol. % of CuO. The CuO-modified glass-ceramics showed the formation of a continuous layer of strong bonding $Cr_2O_3$ at the interface in low partial oxygen ($PO_2$) atmosphere. However, in a local reducing atmosphere, the CuO was preferentially reduced at the surface of glass-ceramic rather than the GC-SS interface for redox.

TABLE 6

CuO-modified glass-ceramics based on SB glass formulation

| Oxides | SB_base (wt. %) | SB025Cu (wt. %) | SB050Cu (wt. %) | SB075Cu (wt. %) | SB100Cu (wt. %) |
|---|---|---|---|---|---|
| $SiO_2$ | 76.01 | 75.68 | 75.13 | 75.00 | 74.67 |
| $Li_2O$ | 12.65 | 12.64 | 12.81 | 12.63 | 12.61 |
| $Al_2O_3$ | 3.83 | 3.82 | 3.82 | 3.82 | 3.81 |
| $K_2O$ | 3.03 | 3.03 | 3.03 | 3.02 | 3.02 |
| $B_2O_3$ | 1.18 | 1.18 | 1.18 | 1.18 | 1.18 |
| $P_2O_5$ | 3.30 | 3.29 | 3.32 | 3.29 | 3.29 |
| CuO |  | 0.36 | 0.71 | 1.06 | 1.42 |
| Note |  | 0.25 mol % CuO | 0.50 mol % CuO | 0.75 mol % CuO | 1.00 mol % CuO |

A modified GC with the addition of CuO as oxidation agent was designed and bonded to SS to prove the concept. Reduction of CuO and precipitation of micron-sized metallic Cu spheres were seen in GC next to the interface. Sub-micron thick $MnCr_2O_4$ bonding layer via redox was formed at the GC-SS interface. There was no P depletion zone in GC. Homogeneous nucleation and growth of crystals were observed throughout the GC. Our preliminary pull tests indicated the strength of GC to SS bond can reach as high as 14000 psi.

Figure 6:
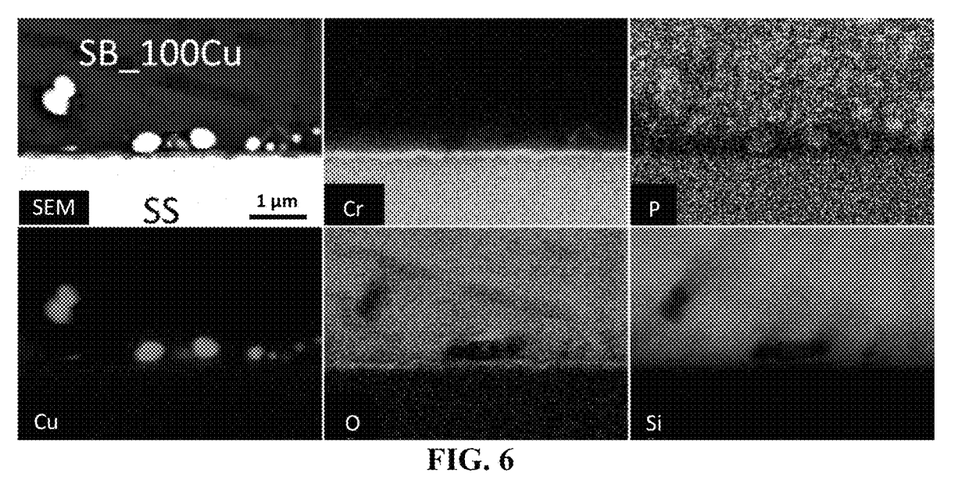
FIG. 6 shows an SEM image and element maps of SB_100Cu sessile drop sample (see Table 6 for the wt. % composition of the BPS_Co2 composition).

An SEM cross sectional examination of the SB_100Cu sessile drop sample is shown in FIG. 6. Key findings included the presence of metallic Cu particles at sub-micron size in the GC near the GC-SS interface. There was no Cu in the bulk GC. All Cu++ appeared to diffuse towards and accumulated next to the interface. Further, there was a thin (e.g., about 0.1 μm) Cr rich oxide layer between the discrete Cu particles and the SS. For comparison, the thickness of oxide layer containing Cr, Mn, and Si from the preoxidation of austenitic stainless steel is about 1 μm (see, e.g., Susan D F et al., "The effects of pre-oxidation and alloy chemistry of austenitic stainless steels on glass/metal sealing," Oxid. Metals 2010; 73(10):311-35). The Cr depletion layer was seen between the thin Cr rich layer and SS, suggesting an interfacial redox reaction. Most importantly, all Cr depleted from SS appeared to accumulate right at the interface without any indication of Cr diffusion into, and subsequent formation of $Cr_2O_3$ in, the bulk GC. The CuO apparently shielded the $P_2O_5$ in GC from being reduced and served as preferred oxidant for interfacial redox. Based on selected area electron diffraction analysis, Cr was the main reducing agent from SS to participate in the interfacial redox, and the interfacial bonding oxide was $Cr_2O_3$.

Figure 7:
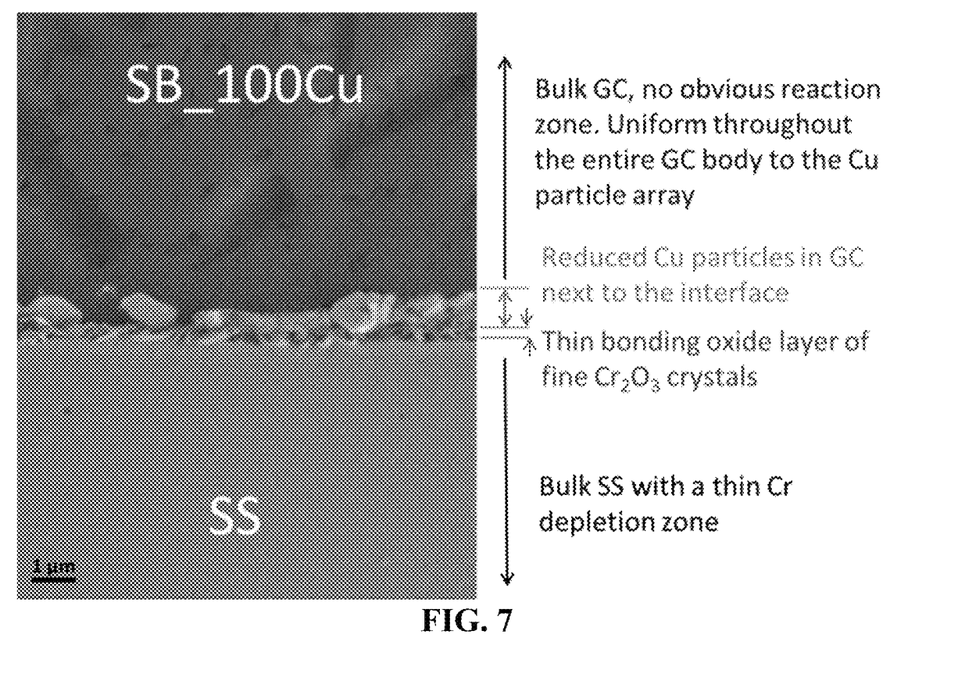
FIG. 7 shows an illustration of GC-SS bonding from interfacial redox for a SB_100Cu sample.

FIG. 7 illustrates the microstructure of the SB_100Cu GC-SS interface as a result of the interfacial redox. Starting from GC, the sequence of the materials can be described as bulk GC, a combination of GC and Cu particles, a thin layer assembly of $Cr_2O_3$ crystals, a thin Cr depletion layer in SS, and bulk SS. However, the observation of reduced Cu particle next to $Cr_2O_3$ was first observed in the current study. It should be emphasized that this type of bonding could occur only in GC-SS seals, where an interfacial redox proceeded over the surface reduction of the oxidants in GC.

Example 4: Multidopant-Modified Glass Ceramics

A few glass-ceramics doped with two oxidants were fabricated (Table 7). The purpose of composition SB050Cu050Co was to learn the combined redox effect from CoO and CuO. The formation of SB100Cu100Pb allowed examining the combined redox from CuO and PbO, as well as the effect of the anticipated decrease in glass-ceramic viscosity on the wetting behavior with the addition of PbO.

TABLE 7

Glass-ceramics with multiple dopants

| Oxides | SB050Cu050Co (wt. %) | SB100Cu100Pb (wt. %) |
|---|---|---|
| $SiO_2$ | 74.71 | 71.53 |
| $Li_2O$ | 12.61 | 12.25 |
| $Al_2O_3$ | 3.81 | 3.71 |
| $K_2O$ | 3.02 | 2.93 |
| $B_2O_3$ | 1.18 | 1.14 |
| $P_2O_5$ | 3.29 | 3.19 |
| CuO | 0.71 | 1.38 |
| CoO | 0.67 | |
| PbO | | 3.86 |
| Note | 0.5 mol % CoO and 0.5 mol % CuO | 1.0 mol % PbO and 1.0 mol % CuO |

Example 5: GC Preforms for Use in Hermetic Seals

The GC compositions herein can be employed in any useful purpose. In one use, the GC composition (including one or more metal oxidants) is formed into a preform, which is then inserted into a cavity in which a hermetic seal is to be formed. Then, the preform is heated to a sealing temperature (e.g., temperature $T_1$) and then processed according to any thermal process that produced a near linear strain GC (e.g., any thermal process described herein). This example provides non-limiting embodiments of preforms and their use.

Figure 8A:
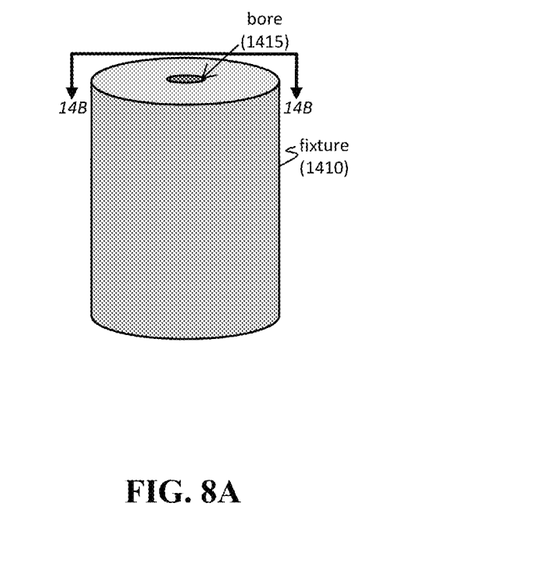
FIG. 8A-8B shows a schematic of an exemplary fixture 1410 (FIG. 8A) an exemplary GC seal between a GC 1425 and a pin 1420 (FIG. 8B).
Figure 8B:
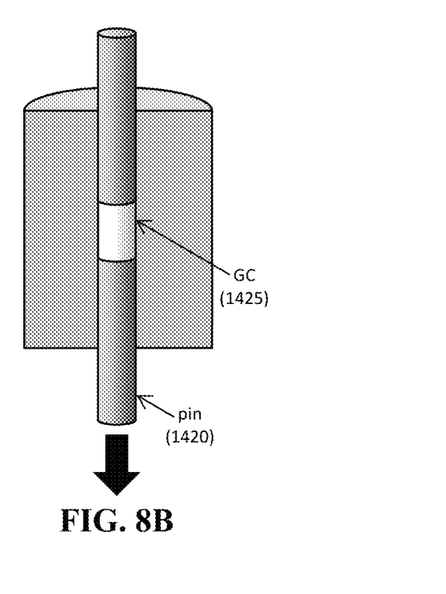

The GC composition herein is particular useful for forming hermetic seals to metals (e.g., stainless steel, as well as other metals described herein). The formation of GC seals can be tested in any useful manner. For instance, FIG. 8A-8B provides a schematic for a fixture 1410 including a bore 1415 through which a metal pin 1420 and a GC preform can be inserted. A seal can be formed between two metal pins 1420 and the GC material 1425, and the strength of this seal can be tested by pulling on the pin (black downward arrow in FIG. 8B).

Figure 9A:
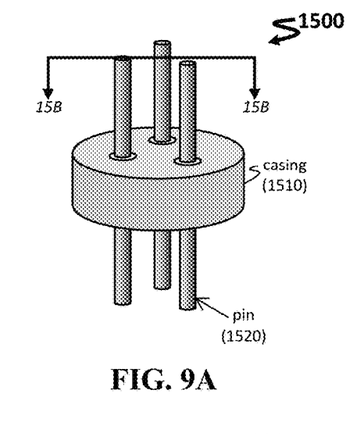
FIG. 9A-9B shows schematics of a connector 1500 having an exemplary GC seal 1525 between a casing 1510 and a plurality of pins 1520 in a perspective view (FIG. 9A) and a cross-sectional view (FIG. 9B).
Figure 9B:
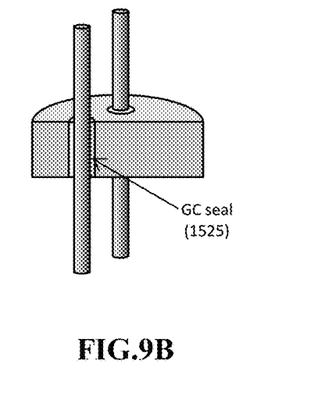

In one embodiment, the GC-to-metal seal includes a hermetic seal with a plurality of pins. As seen in FIG. 9A, the connector 1500 includes a plurality of pins 1520 (e.g., metal pins) disposed within a casing 1510 (e.g., a metal casing). A hermetic GC seal 1525 is formed between each pin and a cavity within the casing (FIG. 9B). The GC seal can include any useful GC composition described herein.

Figure 10A:
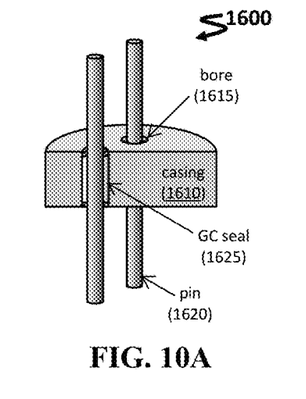
FIG. 10A-10B shows schematics of another exemplary connector 1600 having an exemplary GC seal 1625 between a casing 1610 and a plurality of pins 1620 (FIG. 10A) and an exemplary assembly 1650 to facilitate seal formation (FIG. 10B).

The GC composition can extend along the entire bore of the casing or within only a portion of the bore. As seen in FIG. 10A, the connector 1600 includes a plurality of pins 1620 (e.g., metal pins) disposed within a casing 1610 (e.g., a metal casing), in which a GC seal 1625 is provided within each bore 1615.

The connector can be formed in any useful way. Generally, a solid GC preform is placed within a cavity or bore requiring the GC seal. Then, the preform is treated to a high temperature sufficient to melt the preform, such that the melted GC composition fills the cavity and forms a hermetic seal. During this melting step, the flow of the GC composition should be controlled (e.g., by employing fixtures and/or inserts). Finally, thermal processes are conducted to crystallize particular polymorphs and solidify the seal.

Figure 10B:
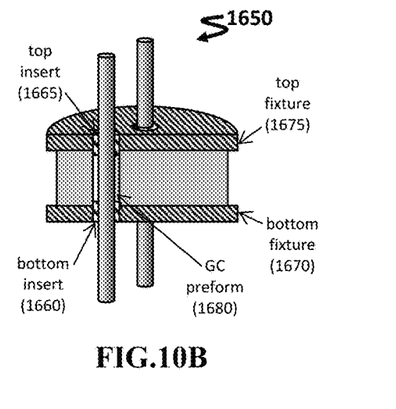

For instance, as seen in FIG. 10B, an assembly 1650 can be employed to control the melting and sealing process. The solid GC preform 1680 is placed within each bore of the casing 1610 in which a seal is desired. To ensure that the GC composition remains within the bore during the melting step (or sealing step at temperature $T_1$, as employed herein), a top insert 1665 and a bottom insert 1660 is placed on each end of the bore. The assembly 1650 also includes a top fixture 1675 located on a top surface of the casing 1610, as well as a bottom fixture 1670 located on a bottom surface of the casing 1610. Each of these fixtures includes recesses that align with each pin 1620 and insert 1660,1665. After sealing, the fixtures and inserts can be removed to provide the connector 1600.

Figure 11:
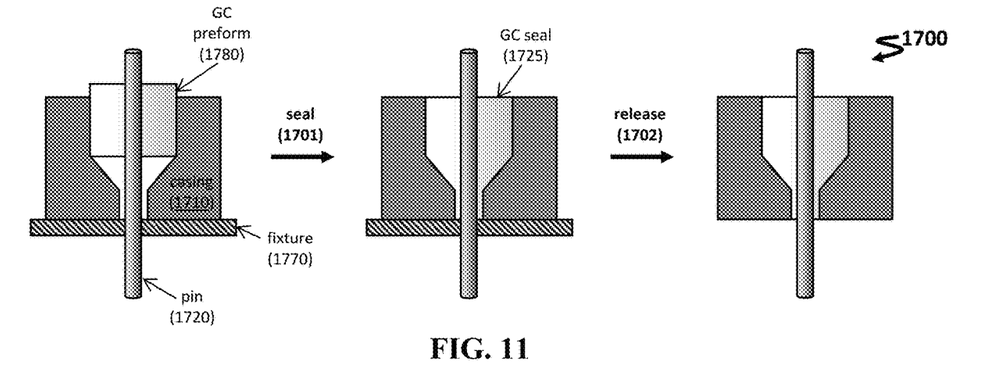
FIG. 11 shows a schematic for an exemplary method of forming a connector 1700.

In another embodiment, the GC seal is formed by employing a molded casing. As seen in FIG. 11, the casing 1710 includes a molded cavity into which a GC preform 1780 is placed. The casing also allows for placement and alignment of a pin 1720. To ensure that the GC composition remains within the molded cavity, a fixture 1770 can be employed. Then, sealing 1701 occurs by heating the assembly to a first temperature $T_1$ sufficient to melt the GC preform. After a thermal treatment schedule, the assembly is released 1702 to form the connector 1700.

Figure 12A:
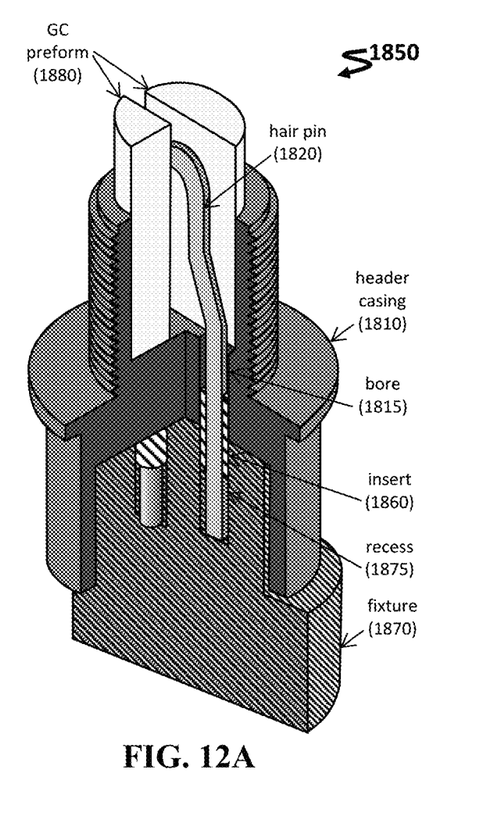
FIG. 12A-12B shows schematics for an exemplary assembly 1850 to form an electrical header 1800 in a cut-away view having a fixture 1870 (FIG. 12A) and omitting the fixture (FIG. 12B).
Figure 12B:
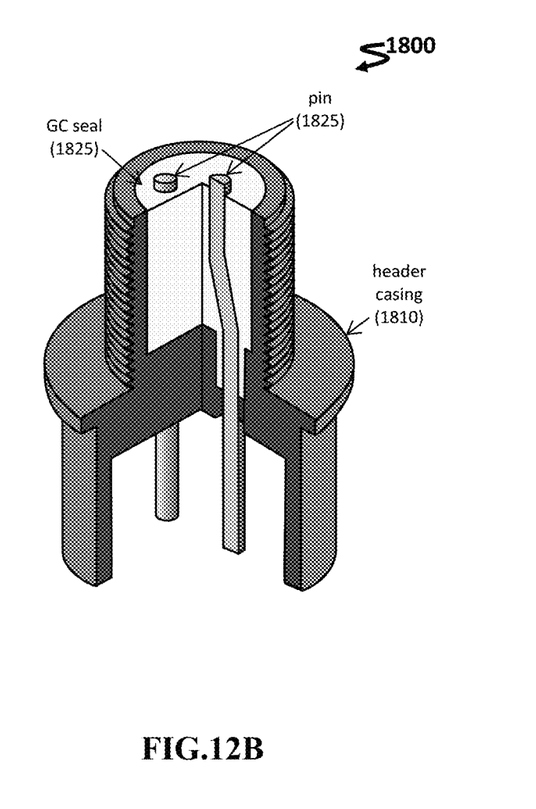

Any useful connector can be employed. In one instance, the connector can be an electrical header. FIG. 12A-12B shows an exemplary assembly 1850 to form an electrical header 1800. The assembly 1850 includes a hair pin 1820 disposed within a cavity of the header casing 1810 and inserted through bores 1815 located within the cavity. In addition, a removable fixture 1870 with aligned recesses 1875 are employed during sealing, and inserts 1860 are placed within the bores 1815 to maintain the GC composition within the bores. The GC preform 1880 is placed within the cavity of the header casing 1810, and the two preforms sandwich the U-shaped portion of the hair pin 1820.

The GC seal 1825 is formed (e.g., using any thermal treatment described herein), and then the fixture 1870 and inserts 1860 are removed from the assembly. In addition, the hair pin 1820 is ground to form two pins 1825 that are properly spaced and sealed within the header 1800. Additional inspecting and testing steps, as well as electropolishing and cleaning steps, can be performed on the final header.

OTHER EMBODIMENTS

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A method comprising:
providing a glass-ceramic component configured to provide a glass-ceramic composition comprising of from about 65 wt. % to about 80 wt. % of $SiO_2$; from about 8 wt. % to about 16 wt. % of $Li_2O$; from about 2 wt. % to about 8 wt. % of $Al_2O_3$; from about 1 wt. % to about 8 wt. % of $K_2O$; from about 1 wt. % to about 5 wt. % of $P_2O_5$; from about 0.5 wt. % to about 7 wt. % of $B_2O_3$; from 0 wt. % to about 5 wt. % of ZnO; and from about 0.5 wt. % to about 5 wt. % of one or more metal oxidants;
providing a metal component, wherein the glass-ceramic component is contacted with a portion of the metal component;
heating the glass-ceramic component and metal component to a first temperature $T_1$ of from about 900° C. to about 1050° C.;
initially cooling the glass-ceramic component and metal component to a second temperature $T_2$ of from about 400° C. to about 750° C.; and
further cooling the glass-ceramic component and metal component to a fourth temperature $T_4$ of from about 10° C. to about 500° C., thereby forming an interfacial seal between the glass-ceramic component and the metal component; and
wherein a plurality of reduced copper particles are within the glass-ceramic component and next to the interfacial seal.

2. The method of claim 1, wherein the heating step comprises rapidly cooling at a rate $r_2$ greater than about 30° C./minute to a second temperature $T_2$ of from about 400° C. to about 750° C., thereby minimizing formation of a cristobalite $SiO_2$ phase within the glass-ceramic composition.

3. The method of claim 1, further comprising, after the initially cooling step:
reheating the glass-ceramic component and metal component to a third temperature $T_3$ of from about 750° C. to about 850° C., thereby facilitating formation of a quartz $SiO_2$ phase within the glass-ceramic composition.

4. The method of claim 1, wherein the glass-ceramic composition comprises of from about 5 wt. % to about 30 wt. % of $SiO_2$ as a cristobalite phase and from about 5 wt. % to about 30 wt. % of $SiO_2$ as a quartz phase.

5. The method of claim 1, wherein the one or more metal oxidants is selected from the group consisting of cobalt oxide, nickel oxide, lead oxide, copper oxide, silver oxide, iron oxide, molybdenum oxide, tungsten oxide, and tin oxide.

6. The method of claim 1, wherein the glass-ceramic component comprises of from about 0.2 mol. % to about 2 mol. % of the one or more metal oxidants.

7. The method of claim 1, wherein the metal component comprises a conductive metal, steel, stainless steel, nitronic steel, palladium, gold, silver, copper, nickel, titanium, molybdenum, chrome, iron, chromium, manganese, silicon, cobalt, aluminum, carbon, and/or an alloy thereof.

8. The method of claim 1, wherein the interfacial seal comprises a metal oxide.

9. The method of claim 8, wherein the metal oxide present in the interfacial seal comprises chromium oxide.

* * * * *